Nov. 9, 1943.  A. L. PARKER  2,333,670
VALVE ASSEMBLY
Filed March 31, 1941   2 Sheets-Sheet 1
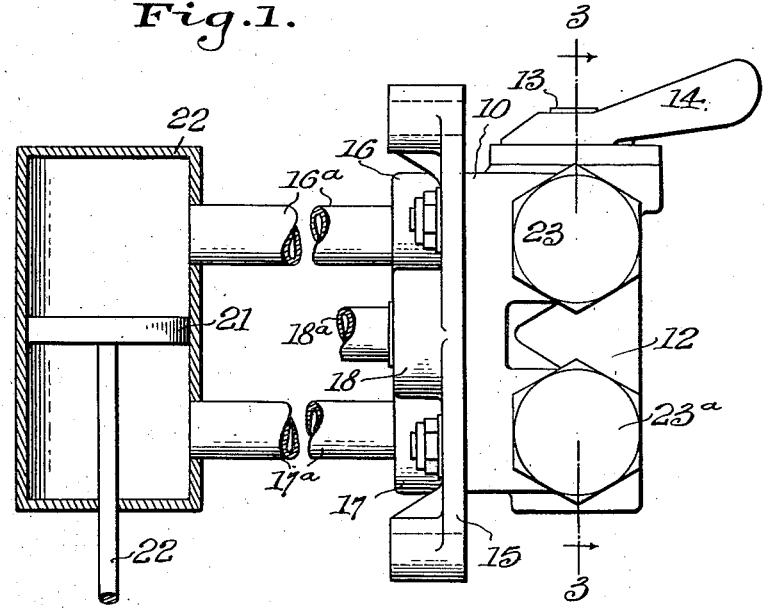
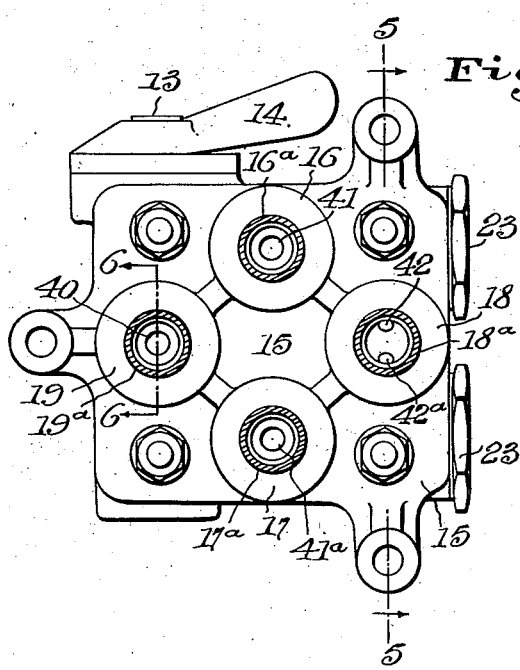
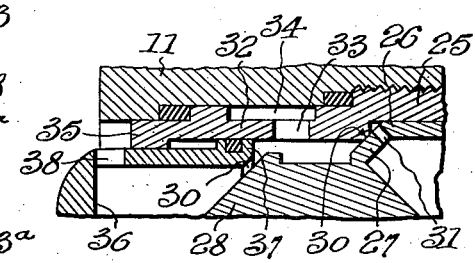

Nov. 9, 1943.  A. L. PARKER  2,333,670
VALVE ASSEMBLY
Filed March 31, 1941  2 Sheets-Sheet 2

Inventor
Arthur L. Parker
By
Mason & Porter
Attorneys

Patented Nov. 9, 1943

2,333,670

UNITED STATES PATENT OFFICE 2,333,670

VALVE ASSEMBLY

Arthur L. Parker, Cleveland, Ohio

Application March 31, 1941, Serial No. 386,199

6 Claims. (Cl. 121—46.5)

The present invention relates to new and useful improvements in a valve assembly, and more particularly to improvements in a valve assembly for selectively controlling the passage and distribution of fluid under pressure.

According to the present invention, the valve assembly is particularly adapted for use in controlling the passage of fluid under pressure to opposite sides of a reciprocating piston which may be employed for operating a remotely situated mechanism, although it is to be clearly understood that the valve assembly of the present invention may be employed in various other installations where it is desired to selectively control the passage of fluid under pressure. The valve assembly is illustrated as including a pair of valve devices mounted within separate valve casings which are in communication with an inlet port for the fluid under pressure and an exhaust port. Each valve casing is also in communication with separate supply ports to which conduits are connected and these conduits lead to opposite ends of the cylinder within which the piston is adapted to reciprocate. Fluid under pressure may be supplied to the inlet port by a power pump or other source of supply and the exhaust port may be connected with a sump or the like. Each valve device includes a main valve member for controlling the passage of fluid under pressure from the inlet port to the supply port and an auxiliary valve which is adapted to close communication between the casing and the exhaust port when the main valve in the same casing is opened for the purpose of directing fluid under pressure from the inlet port to the associated supply port. The other valve device remains closed so that its associated auxiliary valve is open to permit communication between the exhaust port and its associated supply port. In this manner, fluid under pressure can be directed to either end of the piston cylinder and when the fluid is directed to one end of the cylinder, the conduit at the opposite end of the cylinder remains in communication with the exhaust port.

An object of the present invention is to provide a valve assembly of the above type which is provided with an inlet port and an exhaust port and with a plurality of fluid supply ports and which operates to afford communication between the supply ports and the exhaust port when communication between the supply ports and the inlet port is closed.

Another object of the invention is to provide a valve assembly of the above type which is operable to close communication between the exhaust port and the supply port which has been placed in communication with the inlet port, while the other supply port remains in communication with the exhaust port.

A further object of the invention is to provide a valve assembly of the above type having a plurality of valve devices which are selectively operable to connect the inlet port with any one supply port and to automatically close communication between the exhaust port and the supply port which is in communication with the inlet port.

A still further object of the invention is to provide a valve assembly of the above type wherein each valve device includes an auxiliary valve adapted to close communication between the exhaust port and the associated supply port when this supply port is in communication with the fluid under pressure from the inlet port.

The invention still further aims to provide a valve assembly of the above type having valve means operable to alternately connect one supply port with the fluid inlet port and another supply port with an exhaust port so as to enable the valve assembly to be employed for the control of a reversible fluid actuated mechanism.

The above and other objects of the invention will in part be obvious and will be hereinafter more fully pointed out.

In the accompanying drawings:

Figure 1 is an elevation showing the valve assembly and the conduit connection with a reciprocable piston mechanism.

Figure 2 is a side view of Figure 1, omitting the piston mechanism.

Figure 3 is a sectional view showing the multiple valve device and taken substantially along the line 3—3 of Figure 1.

Figure 8 is an enlarged fragmentary sectional view showing the details of one of the valve devices.

Figure 9 is an enlarged end view of the cam shaft which operates the valve device.

Figure 4:
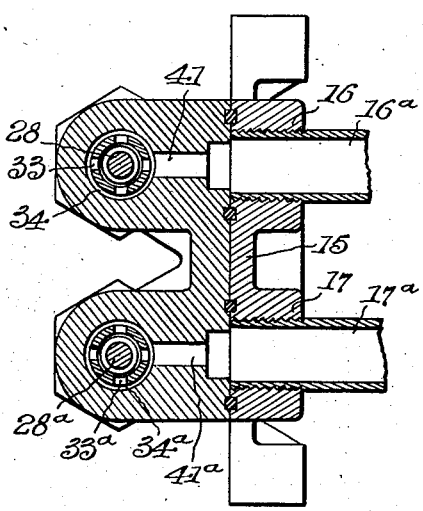
Figure 4 is a sectional view taken substantially along the line 4—4 of Figure 3.
Figure 5:
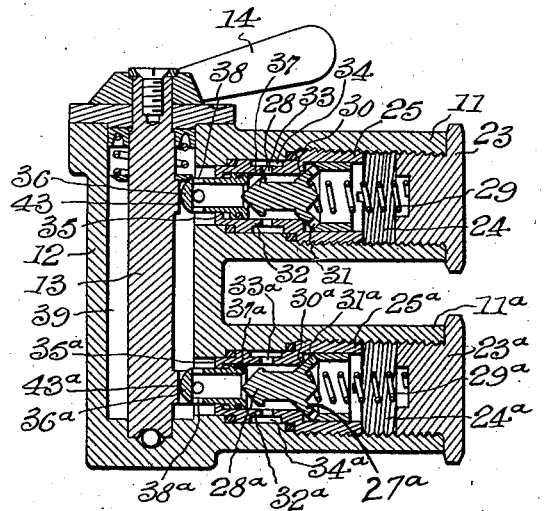
Figure 5 is a sectional view showing the pressure inlet port and its connection with the valve casings, and taken substantially along the line 5—5 of Figure 2.
Figure 6:
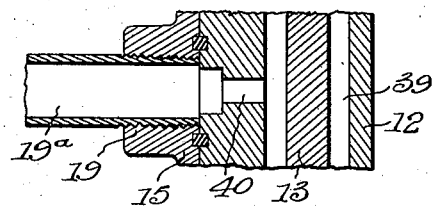
Figure 6 is a fragmentary sectional view taken substantially along the line 6—6 of Figure 2 and showing the exhaust port and its connection with the exhaust casing.
Figure 5:
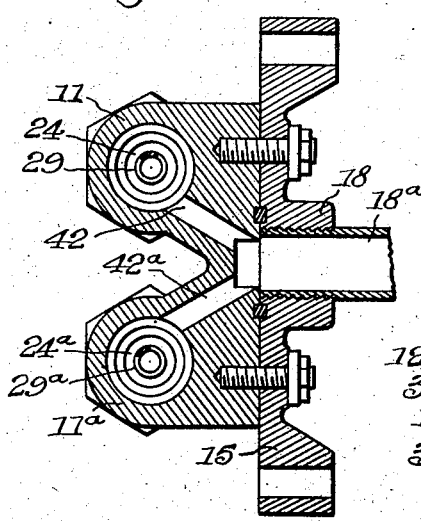

Referring more in detail to the accompanying drawings, and particularly to Figures 1 and 2, the valve assembly is illustrated as including a body portion 10 having outward extensions 11, 11a which are bored to provide valve casings for a pair of valve devices to be hereinafter fully described. The body portion 10 is also provided with a transversely extending casing part 12 which constitutes an exhaust casing and which is in communication with the valve casings at one end of each of the valve casings 11, 11a. A cam shaft 13 is rotatable within the casing 12 by means of a manually operated handle 14 and is adapted to selectively actuate the valve device in a manner to be hereinafter pointed out. The body portion 10 is closed by a plate 15 which may be secured to any suitable support, and is provided with a plurality of ports 16, 17, 18, 19. The supply or distributing port 16 is adapted to be connected by means of a conduit 16a with one end of a cylinder 20 and the supply or distributing port 17 is connected through a conduit 17a to the opposite end of the cylinder 20. Within the cylinder, a piston head 21 is mounted for reciprocation and the piston head carries a piston stem 22 which may be connected in any suitable manner to the device which is to be operated thereby. The port 18 constitutes an inlet port and is adapted to be connected through a conduit 18a with a fluid pump or other source of supply for the fluid under pressure and the port 19 constitutes an exhaust port and may be connected to a conduit 19a for returning the fluid to a sump or the like.

The outer ends of the valve casings or extensions 11, 11a are closed by plugs 23, 23a, respectively, and chambers 24, 24a are provided near the outer ends of the casings. A guiding member in the form of a sleeve insert 25 is mounted within the casing 11 and serves to guide the skirt portion 26 of a valve carrying member. Thus, the skirt portion merges into an inclined valve surface 27 which merges into a valve element 28. The entire valve carrying member is normally pressed away from the cap 23 by a spring 29 which has one end thereof bearing on the valve member within the skirt portion 26 and which has the opposite end thereof bearing against the plug 23. The inclined valve surface 27 is thus normally forced into contact with a valve seat 30 which is formed on the sleeve member 25. This inclined valve surface 27 is provided with openings 31 therethrough and these openings are disposed above the valve seat 30 so that communication between the chamber 24 and the opposite end of the casing 11 is closed when the valve surface 27 is in engagement with the valve seat 30. Below the valve seat 30, the insert 25 is provided with an extension 32 which is provided with lateral openings 33 communicating with an annular chamber 34. The lower end of the extension 32 is provided with an inwardly directed shoulder 35 which serves to guide a cup-shaped valve operating element 36. The element 36 has an outwardly directed shoulder 37 slidably engaging the inner surface of the extension 32 and provides a valve seat for the valve element 28. The opposite end of the element 36 is provided with lateral openings 38 which are in communication with an exhaust chamber 39 within the casing part 12. This chamber 39 is in communication with the exhaust port 19 through a port 40.

The details of the valve device in the casing 11a are identical with the details of the valve device in the casing 11 and suitable packings are provided between the valve parts and the casings in order to prevent leakage of fluid. The ports 38a through the element 36a are also in communication with the chamber 39 in the casing 12 and the annular chamber 34a is in communication with the supply port 17 through an aperture 41a. Similarly, the annular chamber 34 in the valve casing 11 is in communication with the supply port 16 through an aperture 41. The pressure inlet port 18 communicates with the chambers 24, 24a through ports 42, 42a, respectively, so that the fluid under pressure is directed from the inlet port 18 into the chambers 24, 24a and thus also tends to normally seat the valve surfaces 27, 27a.

The shaft 13 is provided with cam surfaces 43, 43a which are disposed in line with the members 36, 36a, respectively, and are offset with respect to one another, as shown in Figure 9, so that the shaft may assume the intermediate position of Figure 3 wherein both valve surfaces 27, 27a are seated in order to prevent the passage of fluid under pressure from the chambers 24, 24a through the ports 31, 31a. The annular chambers 34, 34a are in communication with the supply conduits 16a, 17a through the ports 41, 41a respectively, so that the opposite ends of the piston cylinder 20 are in communication with the chamber 39 and the exhaust port 19 past the valve elements 28, 28a and through the ports 38, 38a.

Figure 7:
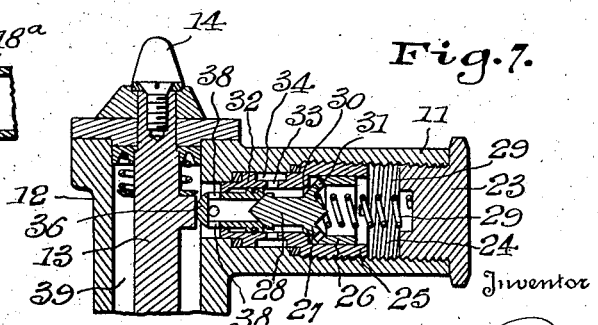
Figure 7 is a fragmentary sectional view, similar to Figure 3, but showing one of the valve devices in a position permitting the passage of fluid from the inlet port through one of the supply ports.

When it is desired to direct fluid under pressure through the supply port 16 and the conduit 16a to one end of the piston cylinder 20, the handle 14 is turned so as to rotate the shaft to such a position that the cam surface 43 will force the element 36 upwardly to the position shown in Figure 7. In this position, the inner end of the element 36 will engage the auxiliary valve element 28 and force the entire valve carrying member upwardly. The passage of fluid around the end of the auxiliary valve element 28 is prevented since the adjacent end of the operating element 36 serves as a valve seat therefor. In raising the valve carrying member, the main valve surface 27 will be shifted away from the seat 30 so that fluid under pressure will pass from the chamber 24 through the ports 31 and into the space within the extension 32. This fluid under pressure is prevented from passing the auxiliary valve member 28 but is permitted to pass through the ports 33 into the annular chamber 34. From the annular chamber 34, the fluid under pressure will pass through the port 41 and into the supply port 16 and then to the piston cylinder. The piston 21 will thus be forced away from the end of the casing 20 to which the conduit 16a is connected and fluid on the opposite side of the piston 21 will be exhausted through the conduit 17a and the port 17. From the port 17, this exhaust fluid will pass through the port 41a and into the annular chamber 34a. From the annular chamber 34a, the fluid will pass through the lateral openings 33a and past the auxiliary valve element 28a and into the interior of the element 36a. This fluid will then pass through the ports 38a into the chamber 39 and then through the exhaust port 19.

When it is desired to shift the piston head 21 in the opposite direction, the shaft 13 is rotated so that the valve mechanism in the casing 11 will return to the position shown in Figure 3 and the corresponding parts of the valve mechanism in the casing 11a will be shifted to afford communication between the inlet port 18 and the supply port 17. Thus, the main valve surface 27a will be shifted away from the seat 30a and the auxiliary valve element 28a will be seated on the inner end of the operating element 36a so as to close communication between the annular chamber 34a and the exhaust chamber 39. In this position of the valve parts, fluid under pressure will pass from the chamber 24a through the ports 31a and into the annular chamber 34a from which the fluid will pass through the port 41a into the supply conduit 17a. When moving the piston in this direction, the supply conduit 16a will be in communication with the exhaust chamber 19 since the auxiliary valve element 28 is open and the main valve surface 27 is closed.

It is to be clearly understood that various changes in the details of construction and arrangement of parts may be made without departing from the scope of the invention as set forth in the appended claims.

I claim:

1. A valve assembly for controlling the passage and distribution of fluid under pressure, comprising a body member having a fluid inlet port, an exhaust port and a plurality of distributing ports; a separate valve casing for each distributing port and each valve casing communicating intermediate the ends thereof with a corresponding distributing port and also communicating adjacent the ends thereof with the inlet and exhaust ports, a sleeve insert disposed within each casing and providing a valve seat between the inlet port and the distributing port, a main valve member in each valve casing adapted to cooperate with the valve seat and each main valve member being guided by said insert, an auxiliary valve member formed as an integral extension of said main valve member and located between the distributing port and the exhaust port, and means for operating said valve members and including an actuating element guided by the insert and providing a valve seat for the auxiliary valve member, and each actuating element being operable in one position to seat against the auxiliary valve member for closing communication with the exhaust port and to shift the main valve member away from its seat for permitting passage of fluid from the inlet port to the distributing port.

2. A valve assembly for controlling the passage and distribution of fluid under pressure, comprising a body member having a fluid inlet port, an exhaust port and a plurality of distributing ports; a separate valve casing for each distributing port and each valve casing communicating intermediate the ends thereof with a corresponding distributing port and also communicating adjacent the ends thereof with the inlet and exhaust ports, means providing a valve seat within each casing and located between the inlet port and the distributing port, a main valve member in each valve casing adapted to cooperate with the valve seat and each main valve member including a closed valve surface and a skirt portion guided within the casing, said main valve member having apertures therethrough between the closed valve surface and the skirt portion for permitting passage of fluid when the main valve member is shifted away from the valve seat, an auxiliary valve member located in each valve casing between the distributing port and the exhaust port, and means for operating said valve members and including an actuating element guided in the casing between the exhaust port and distributing port and providing a valve seat for the auxiliary valve member, and each actuating element being operable in one position to seat against the auxiliary valve member for closing communication with the exhaust port and to shift the main valve member away from its seat for permitting passage of fluid from the inlet port through the apertures in the main valve member and into the corresponding distributing port.

3. A valve assembly for controlling the passage and distribution of fluid under pressure, comprising a body member having a fluid inlet port an exhaust port and a plurality of distributing ports; a separate valve casing for each distributing port and each valve casing communicating intermediate the ends thereof with a corresponding distributing port and also communicating adjacent the ends thereof with the inlet and exhaust ports, a sleeve insert disposed within each valve casing and provided with a valve seat between the inlet port and the distributing port, a main valve member in each valve casing guided by said sleeve insert and adapted to cooperate with said valve seat, spring means for normally forcing said valve member toward a seated position to close communication between the inlet port and the distributing port, an auxiliary valve member formed as an extension of said valve member and located between the distributing port and the exhaust port and movable with said main valve member, and means for operating both of said valve members and including an actuating element providing a valve seat for the auxiliary valve member and shiftable to a seated position for closing communication with the exhaust port and for shifting the main valve member away from its seat to permit passage of fluid from the inlet port to the distributing port, said actuating element being shiftable with said main valve member under the action of said spring means when closing communication between the inlet port and the distributing port and being further shiftable away from contact with the auxiliary valve member by fluid exhausting from the distributing port 4. A valve assembly for controlling the passage and distribution of fluid under pressure comprising a body member having a fluid inlet port, an exhaust port and a plurality of distributing ports; an exhaust chamber in said body member, separate valve casings one for each distributing port and extending outwardly from said exhaust chamber and in communication therewith, each of said valve casings communicating intermediate the ends thereof with a corresponding distributing port and also communicating at one end thereof with the inlet port, means providing a valve seat within the valve casing and disposed between the inlet port and the distributing port, a main valve member in each valve casing adapted to cooperate with the valve seat each main valve member including a closed valve surface and a skirt portion guided within the casing, said main valve member having apertures therethrough between the closed valve surface and the skirt portion for permitting passage of fluid when the main valve member is shifted away from the valve seat, an auxiliary valve member movable with said main valve member and located between the distributing port and the exhaust chamber, an actuating sleeve guided in each valve casing and disposed between the exhaust chamber and the auxiliary valve member, the inner end of said sleeve providing a seat for the auxiliary valve member and the outer end of said sleeve being closed and extending into the exhaust chamber and having lateral apertures, and a cam shaft extending through said exhaust chamber and having cam means engageable with the closed end of each sleeve for shifting the sleeves into engagement with the auxiliary valve members to close communication with the exhaust chamber and to also effect a shifting of the main valve member away from its seat for permitting passage of fluid from the inlet port through the apertures in the main valve member and into the corresponding distributing port.

5. A valve assembly for controlling the passage and distribution of fluid under pressure, comprising a valve casing having a fluid inlet port located at one end thereof and an exhaust port at the other end thereof, a distributing port disposed intermediate the ends of the valve casing, a sleeve insert disposed within the valve casing and provided with a valve seat disposed between the inlet port and the distributing port, a main valve member in the valve casing adapted to cooperate with the valve seat, said main valve member having a skirt guided by said insert and apertures leading through the valve member adjacent said skirt, an auxiliary valve member formed as an extension of the main valve member and located between the distributing port and the exhaust, and means for operating said valve members, including an actuating element guided by the insert and providing a valve seat for the auxiliary valve member, said actuating element being adapted to fit against the auxiliary valve member for closing communication with the exhaust port and to shift the main valve member away from its seat for permitting passage of fluid from the inlet port to the distributing port.

6. A valve assembly for controlling the passage and distribution of fluid under pressure, comprising a valve casing having a fluid inlet port located at one end thereof and an exhaust port at the other end thereof, a distributing port disposed intermediate the ends of the valve casing, a sleeve insert disposed within the valve casing and provided with a valve seat disposed between the inlet port and the distributing port, a main valve member in the valve casing adapted to cooperate with the valve seat, said main valve member having a skirt guided by said insert and apertures leading through the valve member adjacent said skirt, an auxiliary valve member formed as an extension of the main valve member and located between the distributing port and the exhaust, a spring engaging said main valve for forcing the same into engagement with the valve seat on the insert, and an actuating sleeve guided in the insert and disposed between the exhaust port and the auxiliary valve member, the inner end of said sleeve providing a seat for the auxiliary valve member and the outer end of the sleeve being closed and having lateral apertures, a cam shaft extending through the casing and having a cam means engageable with the closed end of the sleeve for shifting the sleeve into engagement with the auxiliary valve member to close communication with the exhaust port and to also effect a shifting of the main valve member away from its seat for permitting passage of fluid from the intake port through the apertures in the main valve member into the distributing port.

ARTHUR L. PARKER.